United States Patent
Baumgartner et al.

(10) Patent No.: US 6,771,453 B2
(45) Date of Patent: Aug. 3, 2004

(54) GLIDE SLIDER FLY HEIGHT CALIBRATION METHOD USING DISK SPIN DOWN AND SLIDER DYNAMIC SCAN

(75) Inventors: Bradley Frederick Baumgartner, Los Banos, CA (US); An-Chou Andrew Chen, San Jose, CA (US); Norman H. Chu, San Francisco, CA (US); Shanlin Duan, Fremont, CA (US); Patricia Galindo, Sunnyvale, CA (US); Roger Yu Lo, Fremont, CA (US); Connie H. Moy, San Jose, CA (US); Hang Fai Ngo, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 385 days.

(21) Appl. No.: 10/011,474
(22) Filed: Nov. 5, 2001
(65) Prior Publication Data
US 2003/0086197 A1 May 8, 2003

(51) Int. Cl.[7] ............................................. G11B 21/02
(52) U.S. Cl. .............................................. 360/75; 360/25
(58) Field of Search .......................... 73/1.86, 7; 360/25, 360/31, 75, 73.03; 324/210, 202

(56) References Cited

U.S. PATENT DOCUMENTS 5,412,519 A * 5/1995 Buettner et al. .......... 360/73.03
6,275,029 B1 * 8/2001 Schaff ........................ 324/212

* cited by examiner

Primary Examiner—David Hudspeth
Assistant Examiner—K. Wong
(74) Attorney, Agent, or Firm—Lewis L. Nunnelley

(57) ABSTRACT

A calibration method for determining the flying height of a glide slider for disk glide height testing is disclosed. The method utilizes a disk with bumps in situ on a disk glide height tester. The method automatically takes into account disk topography, mounting tolerances, and slider roll.

3 Claims, 1 Drawing Sheet

GLIDE SLIDER FLY HEIGHT CALIBRATION METHOD USING DISK SPIN DOWN AND SLIDER DYNAMIC SCAN

BACKGROUND OF THE INVENTION

1. Field of the Invention

This invention is related to magnetic disk drives and more specifically to a method for calibrating the glide sliders used in the manufacture of magnetic recording disks.

2. Description of the Background Art

Conventional magnetic disk drives are information storage devices which utilize at least one rotatable magnetic disk with concentric data tracks, a read/write recording head for reading and writing data on the various tracks on the disk, an air bearing slider in a generally flying mode for holding the recording head adjacent to the disk, a suspension for resiliently holding the slider and the recording head over the data tracks, and a positioning actuator connected to the suspension for moving the recording head across the disk to the desired data track and maintain the recording head over the data track during a read or a write operation.

The primary magnetic components in a magnetic disk drive are the recording head and the magnetic disk upon which information is recorded and subsequently retrieved. The recording head is attached to a slider which floats or flys on a cushion of air above the disk surface. In order to achieve high magnetic recording density it is necessary for the recording head to fly very close to the disk. There is also a requirement that no asperities or protuberances project from the disk surface and contact the slider. Accordingly, during the manufacturing of the disk, there is a need to accurately detect the presence of asperities, if any. This is generally referred to as glide height testing of the disk.

Typically the sliders used for glide height testing are called glide sliders and have an air bearing surface designed such that the flying height varies approximately linearly with respect to the relative speed of the disk (i.e. the speed between the disk and the slider). Because of manufacturing tolerances, glide sliders which have the same targeted design flying height will experience variation in the actual flying heights. Therefore it is necessary to calibrate the flying height of each glide slider. A common method of calibrating the flying height of a glide slider is to fly the slider on a transparent glass disk and measure the flying height using interferometry performed through the transparent disk. A problem with this method of calibration is that a smooth glass disk typically has a different surface topography compared to a magnetic disk which has a surface of lubricant and sputtered carbon. This difference in surface topography can result in a different flying height of the same slider depending on which disk is used. This effect is more pronounced with low flying heights. Contemporary flying heights of ten to twelve nanometers are substantially lower than just a few years ago. As flying heights become even lower in the future, the problems associated with using a transparent glass disk to calibrate glide testing heads will become more pronounced.

The interferometry calibration technique also suffers from mechanical mount tolerances. The mechanical mount tolerances are the variations in distance between the disk surface and the portion of the actuator upon which the suspension is mounted. The difference between the mechanical mount spacing of the interferometry tester and the disk glide tester may result in a difference in flying height of three to four nanometers. This is a very large fraction out of a total flying height of, for example, twelve nanometers. The difference in flying heights caused by mechanical mount tolerances could be eliminated if the glide slider could be calibrated in situ on the actual glide tester to be used for disk testing.

Finally the roll of the slider may be different between the interferometry calibration and the disk glide tester. Slider roll is when one corner of the slider dips below the average flying height of the slider. Roll is used here in the same sense as in aviation where in discussing airplane motion one wing rotates down and the other wing rotates up during a roll. In glide height testing it is the lowest point of the slider, the portion of the slider closest to the disk, which is most likely to first touch a bump or asperity. Therefore it is important to calibrate the glide height slider with respect to the point on the slider having the lowest flying height.

What is needed is a method of calibrating glide height sliders which is free from effects of disk surface topography, free from effects of mounting tolerances, and takes into account the roll of the slider.

SUMMARY OF THE INVENTION

In one embodiment of the present invention a glide slider is calibrated in situ on a disk glide tester which will subsequently be used for disk testing. One embodiment is to use a disk which has fabricated bumps with calibrated heights. A verification is first made to insure that observed contacts are between the glide slider and the bumps. Then the flying height of the glide slider is then raised above the bumps and then gradually reduced by decreasing the speed between the glide slider and the disk until contact occurs. In this manner the differences in flying height from mounting on different testers is solved by calibrating the glide slider on the tester which is to be used in manufacturing for testing disks. Also the surface topography is dominated by lubricant and sputtered carbon for both the disk with bumps and the disks to be tested. Accordingly there is no significant difference in flying heights generated by different surface topographies.

In another embodiment of the present invention, the glide slider is dynamically scanned over the calibrated bumps. Dynamic scanning is accomplished by moving the glide slider radially over the disk at the approximate radial location of the calibrated bump. This insures that the roll of the glide slider is taken into account during the fly height calibration and that the lowest portion of the glide slider is the portion that is in contact with the bump.

Other aspects and advantages of the present invention will become apparent from the following detailed description, which along with the accompanying drawings illustrate by way of example the principles of the invention.

DETAILED DESCRIPTION OF THE INVENTION

A method of calibrating a glide slider according to the present invention includes mounting a disk with one or more calibrated bumps onto a disk glide tester. The speed between the glide slider and the disk is reduced until contact occurs. This method solves several shortcomings, including surface topography, mounting tolerances, and slider roll, of a method based on using interferometry on a separate tester to calibrate the glide slider flying height.

Figure 1:
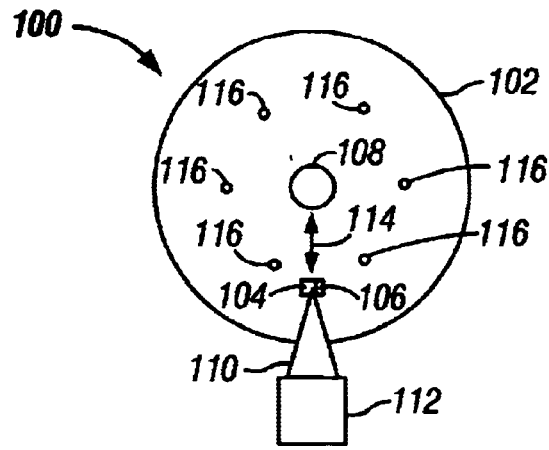
FIG. 1 shows a schematic of a representative disk testing apparatus.

FIG. 1 shows the basic apparatus 100 for testing for the presence of asperities on a disk surface. A disk 102 is mounted on a spindle 108 which is connected to a motor (not shown). A glide slider 104 is attached to a suspension 110. A piezoelectric sensor 106 is attached to the glide slider 104. An electrical signal is monitored from the piezoelectric sensor 106 to determine if a contact has occurred between the glide slider 104 and the disk 102. The suspension 110 is attached to an actuator 112 which is capable of moving in a generally radial direction 114 relative to the disk. In one embodiment of the present invention, there are one or more bumps 116 created on the surface of one disk 102. The bumps 116 may be created by mechanically denting the surface. Alternatively bumps may be created by local heating with a laser. Considerable precision in the height of bumps can be obtained by using the laser technique. The heights of the bumps 116 above the disk 102 surface are conveniently calibrated using interferometry.

It is possible to use one bump for calibrating the flying height of the glide slider 104. However if a pattern of bumps 116 are created, the task of distinguishing the response from the bumps 116 from any possible spurious asperities is greatly simplified. There are many possible patterns which may be used for the placement of bumps 116. For example, in FIG. 1 there are six equally placed bumps 116 placed on the same radius around the disk 102.

Referring again to FIG. 1, the method of calibrating the flying height of the glide slider 104 first requires the glide slider 104 to be placed over the surface of the spinning disk 102 which has calibrated bumps 116. The speed of the glide slider 104 over the disk 102 is chosen so that the glide slider 104 is flying below the height of the bumps 116. For example if the height of the bumps 116 is twelve nanometers, then an appropriate flying height of the glide slider 104 would be ten nanometers. This insures contact between the glide slider 104 and the bumps 116. The actuator 112 is then used to place the glide slider 104 at the approximate radius of the bumps 116. Next, a dynamic scan is performed by moving the glide slider 104 radially over the bumps 116. The output of the piezoelectric sensor 106 is inspected during the dynamic scan to detect all contacts between the glide slider 104 and the disk 102. The sequence of detected contacts is then compared and matched to the specific pattern of bumps 116. For example, if the pattern of six bumps 116 in FIG. 1 is used, then the detected contacts is examined for a correlation in time with a bump 116 at every 60 degrees on the disk 102. Equally spaced bumps 116 form a convenient pattern. The absence of contacts in the space between the bumps 116 also help determine if the disk is free of spurious asperities. The number of bumps 116 which can conveniently be used at a given disk radius ranges in general from two to about forty.

After verification has be successfully performed, the fly height of the glide slider 104 is increased. Generally, the relative speed of the glide slider 104 at this point is such that the glide slider 104 is flying higher than the height of the bumps 116. A dynamic scan is used to find the lowest flying portion of the glide slider 104. This dynamic scan automatically takes into account any roll the glide slider 104 may have.

If contact between the glide slider 104 and the bumps 116 is not detected after performing the dynamic scan, then the rotational speed of the disk 104 is lowered by a discrete interval. This reduces the relative speed between the glide slider 104 and the disk 102 and has the effect of lowering the flying height of the glide slider 104. After decrementally reducing the flying height of the glide slider 104 another dynamic scan is performed.

After a number of decremental decreases of disk rotation speed, the flying height of the glide slider 104 will be low enough to cause contact between the slider and the bumps 116. The threshold speed between the glide slider 104 and the disk 102 which first causes contact with the bumps 116 is called the spin down speed. The spin down speed is then the speed which for that particular slider 104 gives a flying height equal to the height of the bumps 116.

After a verification has been successfully performed and the spin down speed has been determined, the calibration procedure is terminated.

During the use of a given calibrated glide slider for routine disk testing, the spin down speed is used if the bumps used for calibration were equal to the desired flying height of the slider. Alternatively, if the calibrated bumps were not equal to the desired flying height for testing, then another speed may be chosen if the relationship between speed and flying height is known.

Referring again to FIG. 1, during a routine glide height test of a given disk 102 it is customary to move the slider 104 radially 114 over the disk 102 to test the entire surface. Typically as the radial position of the glide slider 104 is changed the rotational speed of the disk 102 is also changed in order to maintain the same relative speed between the glide slider 104 and the disk 102.

Figure 2:
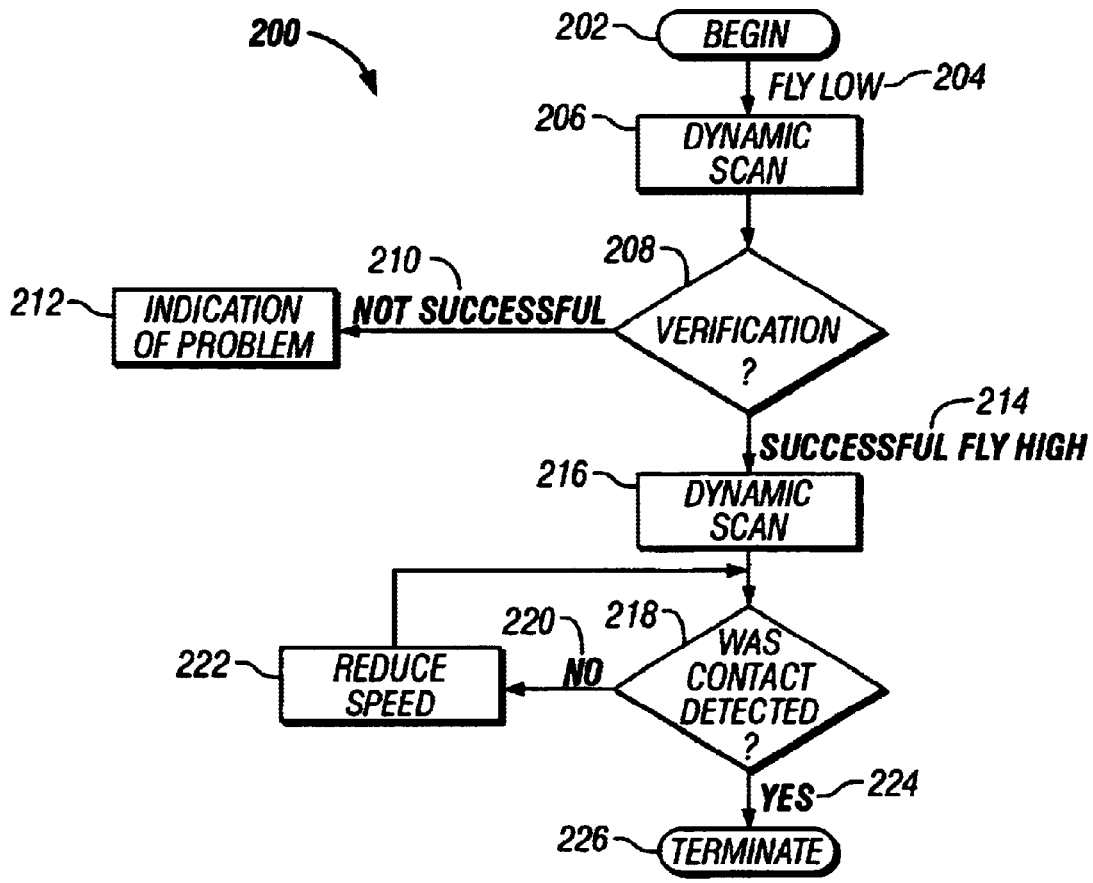
FIG. 2 shows a summary of the invented method for glide slider flying height calibration.

A summary 200 of a flying height calibration method according to the present invention is illustrated in FIG. 2. To begin the calibration 202, a glide slider with an attached piezoelectric sensor is placed over the surface of a spinning disk having at least one calibrated bump. Typically the initial speed between the glide slider and the disk is such that the flying height of the glide slider is lower 204 than the bump. For example if the height of the bump is twelve nanometers then the initial flying height of the glide slider could be ten nanometers or lower. A dynamic scan 206 of the disk surface is performed by moving the glide slider radially across the radial position of the bump. Next a verification 208 is performed. A verification 208 could fail 210 for having too many extraneous asperities. The allowable number of extraneous asperities can be preset to any desired value. An increase in the number of extraneous asperities usually indicates contamination or handling damage of the disk. A verification may also fail if a preset number of bumps are missing. This may happen if one or more bumps show excessive wear. If the verification is not successful 210 a problem is indicated 212 and the disk is usually retired.

If the verification 208 is successful 214 then the speed is increased enough such that the flying height of the glide slider is higher than the bump heights. Then a dynamic scan is performed 216 and the piezoelectric sensor is inspected 218 for evidence of contact. If contact is not indicated 220 then the speed is lowered 222 by a discrete step in order to lower the flying height of the glide slider and the dynamic scan 216 is again performed. This sequence is performed until contact is detected. Once contact is made 224 the spin down speed has been determined and the calibration procedure is terminated 226.

From the foregoing it will be appreciated that the method provided by this invention provides for a glide slider which is calibrated on the disk glide tester where the glide slider will be used. Thus the problem of remounting a calibrated glide slider is solved. The invented method also takes into account any roll the glide slider might have which would otherwise give erroneous results.

We claim:

1. A method for calibrating the flying height of a glide slider by determining the spin down speed of the glide slider using a disk with at least one calibrated bump, comprising:

flying the glide slider over a rotating disk;

verifying that observed contacts are between the glide slider and the bump;

reducing the speed between the glide slider and the disk by a discrete interval;

dynamically scanning the disk at each interval of speed;

calibrating the flying height of the glide slider when a value of the spin down speed has been successfully determined.

2. A method as in claim 1 wherein after verification the initial flying height of the glide slider is higher than the calibrated bump.

3. A method as in claim 1 wherein from two to forty equally spaced calibrated bumps are on the disk.

* * * * *